United States Patent [19]
Yazaki

[11] 3,941,087
[45] Mar. 2, 1976

[54] RESIN COATED STEEL PIPE AND THE PROCESS AND EQUIPMENT FOR ITS PRODUCTION

[76] Inventor: Yoshimi Yazaki, Nakamaru-cho No. 9-3, Itabashi, Tokyo, Japan

[22] Filed: Sept. 30, 1974

[21] Appl. No.: 510,640

Related U.S. Application Data

[63] Continuation-in-part of Ser. No. 280,084, Aug. 14, 1972, abandoned.

[30] Foreign Application Priority Data

Aug. 12, 1971 Japan.............................. 46-61505

[52] U.S. Cl. ........... 118/306; 118/DIG. 10; 219/8.5
[51] Int. Cl.[2] ......................................... B05B 13/06
[58] Field of Search............. 118/306, 317, DIG. 10; 219/10.53, 8.5

[56] References Cited
UNITED STATES PATENTS

| | | | |
|---|---|---|---|
| 2,693,782 | 11/1954 | Moore ................................. | 118/317 |
| 3,245,824 | 4/1966 | Treat et al. ......................... | 118/306 |
| 3,270,176 | 8/1966 | O'Neill et al. ...................... | 219/8.5 |
| 3,379,853 | 4/1968 | Domizi................................. | 219/8.5 |
| 3,406,271 | 10/1968 | Cachet et al........................ | 219/8.5 |

*Primary Examiner*—Mervin Stein
*Assistant Examiner*—Steven Hawkins
*Attorney, Agent, or Firm*—Eliot S. Gerber

[57] ABSTRACT

A resin coated steel pipe is produced by forming the pipe from a band using forming rollers, welding the seam, inserting a paint sprayer which coats an anti-corrosive coating on the inside wall of the pipe, applying an adhesive on the outer surface of the pipe, and applying a layer of the synthetic resin over the adhesive layer. The paint sprayer includes a gun-pipe which protrudes through a stack of ferromagnetic cores, which cores are water-cooled and are used for welding the seam.

8 Claims, 16 Drawing Figures

RESIN COATED STEEL PIPE AND THE PROCESS AND EQUIPMENT FOR ITS PRODUCTION

DETAILED DESCRIPTION OF THE INVENTION

This application is a continuation-in-part of U.S. Patent application Ser. No. 280,084, filed Aug. 14, 1972 and entitled "Resin Coated Steel Pipe And The Process And Equipment For Its Production", now abandoned.

The invention relates to the process and equipment for manufacturing steel pipe protected by an outer covering of synthetic resin adhered to the pipe by an adhesive.

The principal object of the invention is to provide equipment to produce resin covered steel pipe, the pipe having an excellent mechanical characteristic and being free from cracks and peels of the coating layer of synthetic resin, even at a sudden change of outdoor temperature, shock or deformation.

A further object of the invention is to provide apparatus for rustproof treatment of the inner surface of the resin coated steel pipe.

For this purpose, the inner surface of the steel pipe is, according to the invention, coated with a rustproof paint in the stage of the manufacturing of the steel pipe out of steel band plate, and the outer coating synthetic resin and steel pipe are adhered tightly by means of adhesive coated on the outside of the pipe before the synthetic resin is applied.

The steel pipe on the surface of which synthetic resin is coated has an excellent mechanical strength, a smooth surface, a good appearance and is corrosion-free. For this reason it finds application for clothes poles for drying, in household use in general, and also for frame houses to be assembled, such as greenhouses, garages, store houses, etc.

It has been said hitherto that the resin covered pipes have the disadvantages of poor bending strength, poor impact stress, and are liable to fracture and peel when they are used as a construction material.

The principal reason for these disadvantages comes from the way of manufacturing them in the past. Generally resin covered pipes are made from thin band steel plate, called hoop stock, which is worked into pipes continuously and their joints welded electrically. Then synthetic resin of any kind is applied as a coating on the surface of the steel pipes, which is done in mass-production.

If the band steel plates are too thick, it makes it difficult to work them continuously by means of forming rollers and, since this forming is done in cold working, all the inner stresses produced in the course of forming of the steel pipes remain and these remaining stresses are liable to cause breaks, fatigue, deformation, and progressively attack the resin covered pipes.

It has been offered as means for strengthening these resin covered pipes a process of filling them with wood compositions into the inner hollow of the steel pipe, or filling them with cellular formed resin, or with a limb formed with polyester, etc. Some of these suggestions have been applied in practice. With all these proposals, to some extent some strengthening effect has been obtained. But in the first described way, the weight of the pipe increases enormously and in its application a number of inconveniences have been confirmed. In the latter way, it was found that the forming of the strengthening limb and the technique of thrusting the formed limb to achieve desired effect was not easy. There were many elements of the prior art proposals that looked impossible for application in industrial production, and in both ways the production cost was extremely high.

Examining the traditional resin covered pipe from another point of view, it is proved that the binding capacity, that is to say, the adhesion between the covering synthetic resin and steel pipe, is poor and that there is a considerable difference in the coefficient of thermal expansion of each material and in the elastic modulus too. So when the change of heat is repeated or when the pipe is exposed outdoors, or impact is changed, or if deformation moment is exercised repeatedly to the pipe, and if it goes beyond its limited tolerance, the layers of the synthetic resin become cracked and peel. Such cracking and peeling happen often in the known pipes. However, according to the invention, the concentration of the stresses arising from the difference of the coefficient of thermal expansion and elastic modulus of the steel pipe and the synthetic resin is distributed over the layer of the adhesive of the steel pipe and it does not cause the cracks and peels.

In the following it will be shown how effective the improvement in the mechanical characteristics of the resin coated pipe according to the invention is, in comparison to the products hitherto known.

1. Cut and peeling test on the adhesive surface of steel pipe and coating resin

Figure 8:
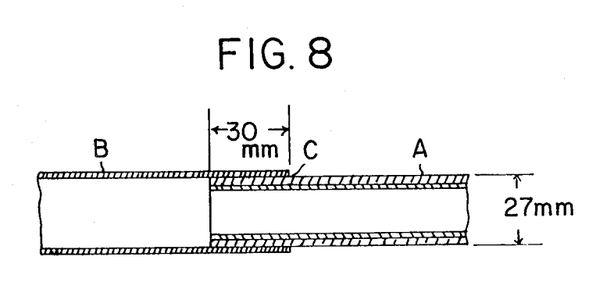
FIG. 8 shows an example of the art and peeling test on the adhesive surface of steel pipe.

As FIG. 8 shows an example of this test, a pipe B was thrusted 30 cm deep into another test piece pipe A. The pipe A is coated with the resin — object of the test — over the outer surface. The both pipes were adhered by means of adhesive. Then a tensile load was given in the axial direction. The test material being:

| | |
|---|---|
| Steel pipe | JIS SPC |
| Thickness of steel pipe | 0.6 mm |
| Coating resin | ABS resin |
| Average thickness of resin coating | ca 1 mm |
| Outer diameter of finished pipe | ca 27 mm |
| Condition of the test: | |
| Area of adhesion of both pipes | ca 25.8 cm$^2$ |
| Tensile speed | 0.5 cm/min |
| Room temperature | 20°C |
| Relative humidity | 55% |

The result of the test proved that the capacity of the tensile strength at the moment when a break took place along the circumsphere at point C, and the slide or break of resin occurred, was at the product which was made with the resin and steel pipe adhered together at 6579 Kg (255Kg/cm$^2$), that is to say, about six times of the value 1 1095 Kg (43 Kg/cm$^2$) of the product known hitherto.

Further, with the test material according to the invention, there occurred no slide between the boundary layers; instead the resin itself yielded to break.

2. Test in the acetic acid bath

The test was made with the same material as in the first case.

The condition of the test:

The test pieces were soaked in the acetic acid solution (16°C) of 33.3% in vol. avoiding the effect of the section of the both ends of the test pieces. And the time until the crack - perceptible with naked eyes - was checked.

The test shows that the crack was observed in about 2 minutes at the known product, while at the test pieces according to the invention, the cracks of the same kind took place after about 50 minutes.

3. Bending test

Figure 9:
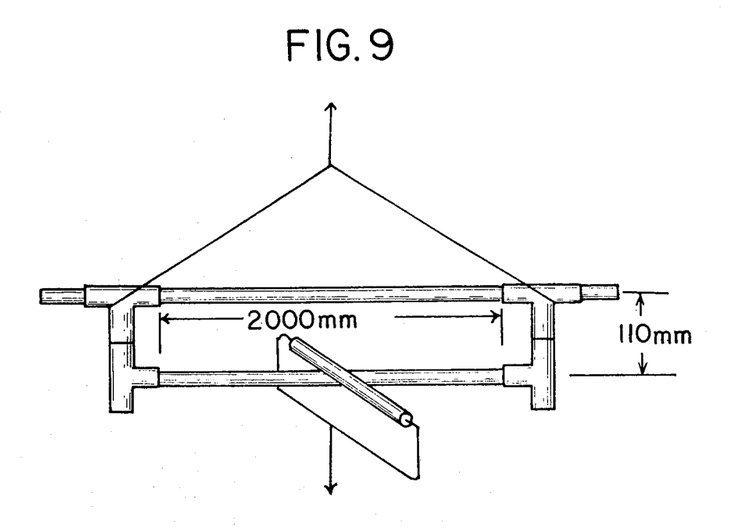
FIG. 9 illustrates the bending test carried out in accordance with the practical Bending Test Process.

This test was carried out in accordance with the practical Bending Test Process as illustrated in FIG. 9, with the same material as in the first case.

The result of the test was as the following list:
The condition of the test was:

| Apparatus used: | Tensile tester Shopper Type |
| --- | --- |
| Tensile speed: | 200 mm/min |
| Distance between supporting points | 2000 mm |
| Test Temp. : | 25°C |
| Time for adjusting the condition: | 4 hours at 25°C |

| | DEFLECTION (mm) | | | | | | | |
| --- | --- | --- | --- | --- | --- | --- | --- | --- |
| Bending | Pipes acc. invention | | | | Pipes without adhesive | | | |
| load Kg | No.1 | No.2 | No.3 | average | No.1 | No.2 | No.3 | average |
| 5 | 7 | 8 | 8 | 8 | 7 | 8 | 8 | 8 |
| 10 | 14 | 15 | 15 | 15 | 16 | 17 | 18 | 17 |
| 15 | 21 | 22 | 22 | 22 | 24 | 26 | 28 | 26 |
| 20 | 28 | 30 | 29 | 29 | 36 | 37 | 37 | 37 |
| 25 | 40 | 40 | 43 | 41 | 48 | 50 | 52 | 50 |
| 30 | 65 | 63 | — | — | — | — | — | — |
| Buckling load Kg | 31 | 31 | 30 | 31 | 26 | 27 | 28 | 27 |

As it is learned from the list above, the resin coated pipe according to the invention shows a considerable difference in strength in comparison to the known products at which the resin layer and steel pipe are not adhered. Comparing the buckling load it was observed that there appeared differences of 4 to 5 kg that came from the application of adhesive.

Another effect of the adhesive for the resin layer and the steel pipe was that the coated resin does not easily crack and even if it gets cracks the outer surface does not peel off and keeps its good appearance.

A further object of the invention is to provide a process to produce resin coated pipe as described above in a continuous mass-production system.

It is a known technique to manufacture steel pipes, leading the band steel plate through a group of forming rollers, and after forming them into pipes, to weld the seaming points continuously. This method is called process of manufacturing pipes with electric knitting.

Although the above-mentioned electric knitting manufacturing process of steel pipe is applied in the present invention, that process is improved by using ferromagnetic induction cores which are water-cooled. The ferromagnetic cores concentrate an induced current produced by means of high-frequency induction coils located outside of the pipe and close to the seaming position. A gun-pipe coats the inner surface of the steel pipe, said gun-pipe being thrusted into the steel pipe along with the ferromagnetic induction cores. This has the purpose of raising the productivity and accomplishing the inner coating.

Hitherto it was usual to cut the pipe to a certain length and then into an anti-rotting liquid as a process for coating the inside of the pipes of this kind.

According to the invention, the inner coating is carried out at the same time as the production of the electric knitted (welded) pipes, contrary to the industrially not efficient method hitherto known. Furthermore, the remaining heat from the welding of the steel pipe is used to bake the coating on the inner surface of the pipe. The paint will dry at once after the spraying and it becomes a superior rust-resisting paint.

The manufacturing of pipe can be carried out in one single line of production, as the steel pipe is welded while applying the inner coating as described above, and subsequently the pipe passes through a device for spraying of the adhesive on its outer surface and then it goes through the die of an extruder to extrude the synthetic resin thereon.

The invention will be explained with reference to the drawings.

Figures 1, 3:
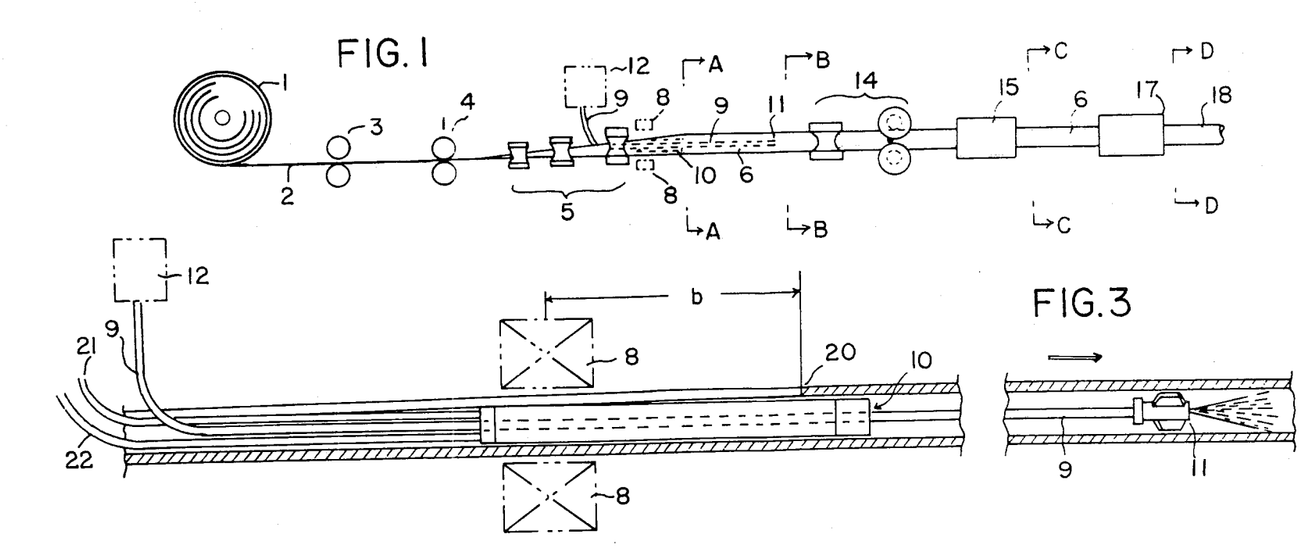
FIG. 1 shows a schematic view of the production of resin adhered pipe.
FIG. 3 shows a concentration device thrust into a steel pipe.
Figure 2A:
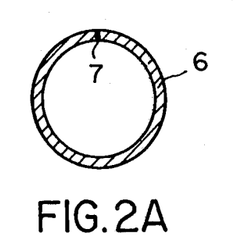
FIG. 2A, FIG. 2B, FIG. 2C and FIG. 2D show cross-section views of the steel pipe.
Figure 2B:
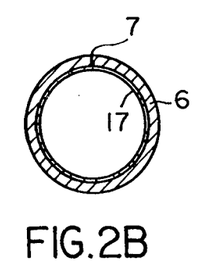

FIG. 1 shows a schematic explanation of the production of resin adhered pipe according to the invention. The band steel plate 2 coming out of the coil 1 obtains distortions etc. removed while passing through pinch-rollers 3 and 4, and then it is led through a group of forming rollers 5. The band steel plate 2 which passes through the group of forming rollers 5 turns into cylinder form as it goes forward, obtaining strong forming pressure. The line where both edges of the plate meet is welded continuously under strong forming pressure while also simultaneously being exposed to high frequency induction heating and it is worked into steel pipe 6. The cross-section surface is shown in FIG. 2A. In the drawing, 7 shows the spot of welding. The induction cores make up an enforced concentration device 10 in combination with the gun-pipe 9, for spraying rust-resisting paint on the inside surface of steel pipe 6. This concentration device 10, as shown in FIG. 3, is thrusted into the steel pipe that is being formed into a complete pipe by means of a forming roller group 5, through its still wide open split of joint line, and it is set at the determined position in the hollow within the pipe. At the end of the gun-pipe 9 an injection nozzle 11 is attached for spraying rust-resisting paint in the axial direction. The position of the nozzle 11 is set about 20 to 30 cm forward from the point of seaming 20. The body part of the gun-pipe 9 is connected with the installation 12 for the spray-gun. The cross-section of the inside-coated steel pipe is shown in FIG. 2B, where 13 is the layer of rust-resisting paint. The inside coating of the steel pipe 6 is carried out at the distance of only about 20 to 30 cm from the seam line 20, so the coating is made taking advantage of the remaining heat of the welding, therefore a bake-coating is obtained without additional heating. The resin paint, for instance, belonging to phthalic acid etc. seems best suitable as a rust-resisting paint.

Figure 2C:
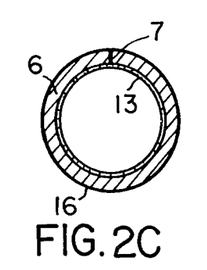

As described above, the steel pipe 6, with its inside coating, after passing through the correction rollers 14, goes into the installation 15 for the spraying of an adhesive thereon and also for recovery of the remainder of the adhesive, and thus the adhesive 16 as shown in FIG. 2C is applied on the surface of the steel pipe in a baking process. It is desired that the adhesive 16 be of thermosetting nature to obtain the best results in the process of coating resin material around the pipe. The result depends much upon the kind of resin to be employed. For instance, when the ABS resin is used for coating, an adhesive of the rubber family brings about a satisfactory result. In this way the steel pipe 6, to which adhesive 16 is to be applied on its surface, is led subsequently through the die 17 of the extruder for forming and is covered with a suitable synthetic resin, and thus the desired product, the resin coated and adhesive tight pipe 18, is obtained.

Figure 2D:
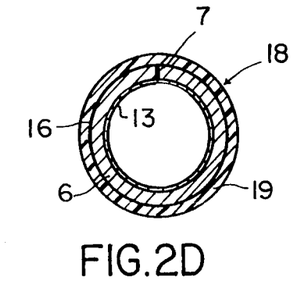

The cross-section of the resin coating with adhesive pipe 18 is shown in FIG. 2D, in which 19 represents the coating resin.

Now, the construction of the device for the forced concentration device 10 will be explained in detail with reference to FIG. 4. In the center of the pipe, a gun-pipe 9 is thrusted and around this gun-pipe ferromagnetic cores 101 are set in a concentric position. The cores 101 act to raise the efficiency of the induction current used to weld the pipe. For the material of cores 101, in consideration of their function, ferrite (of ferromagnetic substance) is preferred.

The inner diameter of the cores 101 must be a little bigger than the outer diameter of the gun-pipe 9, but its outer diameter is limited by the inner diameter of the steel pipe 6. Therefore, it cannot be so big and is formed like a small cylinder. The cores 101 play the same function even whey they are made as once piece of a long hollow cylinder, but it is more convenient when the cores 101 are made in several cylinders, in case when the distance 1 (normally 1 is about 80 mm) between the work coil 8 and the seam point 20 is determined in a varied distance, because the use of a number of cores permits the adjustment of the length of the total cores by adding or reducing the number of coils. A ring-form coil can be made, practically, of a number of small sticks of ferrite bound together and arranged in a circular form, which provides the same effect as other forms.

On both ends of the cores, complying with the desired length, sleeves 102 made of electrical insulated material, for example, of bakelite, with almost the same dimension as cores 101, are fixed and for both sleeves 102, the pipe 103, made of electrically insulated material, bakelite likewise, are fitted by means of screws. A pipe holder 104 is fixed with screws to said pipe 103, at the left side in FIG. 4. The pipe holder 104 is screwed with a high degree of water-tightness, into a casing pipe made of insulated and thermally stable material, for instance, of polyester Melamine resin (TM of Celanese Corp.) containing glass fiber and having an inner diameter a little bigger than the outer diameter of the cores 101.

Figure 4:
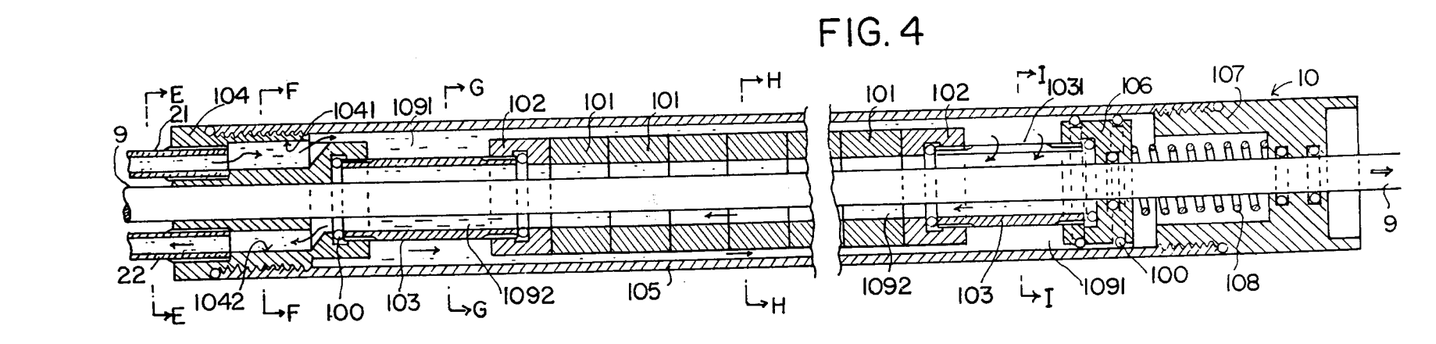
FIG. 4 shows the forced concentration device.
Figure 5E:
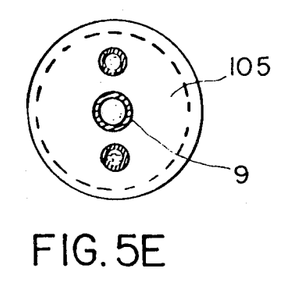
FIGS. 5E to 5I illustrate the device for circulation of cold water.
Figure 5F:
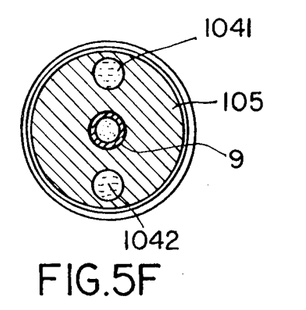
Figure 5G:
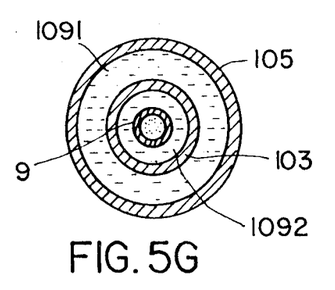
Figure 5H:
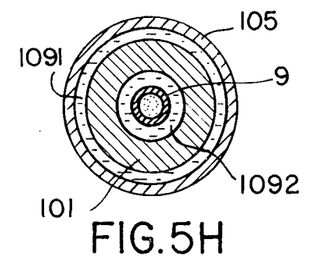
Figure 5I:
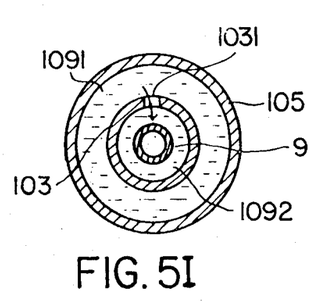

A slide sleeve 106 is screwed to hold the pipe 103 on the left side as shown in FIG. 4, and a coil spring 108 providing pressure is fixed between the cap 107 that connects the casing pipe 105 at its other end, with the slide sleeve 106. Thus a regular formation is maintained under the push pressure in the axial direction of the row of finished cores.

It sometimes happens that the cores must be connected to each other by means of adhesive, depending upon the form of the cores and the length of the row. The length of the cores can be changed by the distance of sleeve 106 and the cap 107 in accordance with the length 1 of the row of the cores.

It is necessary to cool the cores 101 well because the cores become heated by the loss of energy in induction and the cooling improves their magnetic permeability. The device for circulation of cold water is shown in FIGS. 5E-5I and includes two ports 1041 and 1042 that penetrate in axial direction through the pipe holder 104 in the left side of FIG. 4. The port 1041 has a connection with the closed space 1091 (referred to as outer space) between the casing pipe 105 and the cylindrical body composed of the pipe 103 within the casing, sleeve 102 and the row of cores 101.

Another closed space 1092 (referred to as inner space) that is composed between the cylinder, consisting of the pipe 103, sleeve 102 and the row of cores 101 and the gun-pipe thrusted into the middle of the cylinder, connects itself with the other port 1042. And these inner and outer spaces 1091, 1092 are connected through a connection canal 1031, which is bored in the pipe 103 on the right side in FIG. 4, and this hold serves for the circulation of cold water. So, when the inlet and outlet pipes 21 and 22 for water are connected with the ports 1041 and 1042 and the cooling water flows, the water goes in through the outer space 1091 and comes back through the inner space 1092, that is to say, its return way. So the cores are well cooled.

Further for preventing the leak of water which by all means has to be kept away from the thermosetting paint for bakecoating, linings 100 are put in all necessary split parts so that the whole system works in a water-tight condition.

The welding of the pipe occurs by means of induced heat, the induction coils 8 being high-frequency coils placed near the seaming position and connected to a source of high-frequency alternating current. The rollers, at the seaming position, have brought the ends of the steel together and the induced heat welds the seams. The ferromagnetic cores act to concentrate the induced current from the coils 8 and thereby aid in welding the pipe. A suitable frequency for the induced current from coils 8 is found by the formula:

$$p = 5030 \ \sqrt{\rho/\mu f}$$

where $\rho$ is the resistance, $f$ the frequency in hertz, $\mu(o)$ the magnetic permeability and p the depth it is required for the heat to penetrate.

The device 15 for spraying and recovering of adhesive will be explained with reference to FIG. 6 and FIG. 7 as follows:

The main part of the device consists of a closed spray tank 151, through which the steel pipe 6 passes in a horizontal direction, three sets of air-spray-guns 152, 152, 152, that are adjusted for spraying on the steel pipe that runs through the spray chamber, and of a high pressure pump 154, which makes high speed spraying, feeding the spray-gun with liquid adhesive. It goes without saying that, besides the elements mentioned above, some other parts are necessary for the good function of the device in spraying and recovering of adhesive, such as stirrer 155 that serves to prevent the degeneration of the adhesive 16 which dissolves with flux, stays in the container tank 153, and also a motor 156 that drives the stirrer, and further an auxiliary tank 157.

The compressed air, which is the generating source of the pump 154 is sent from the air-compressor, not indicated in the figures, through an accumulator continuously, so that the spraying is performed in good order.

Figure 6:
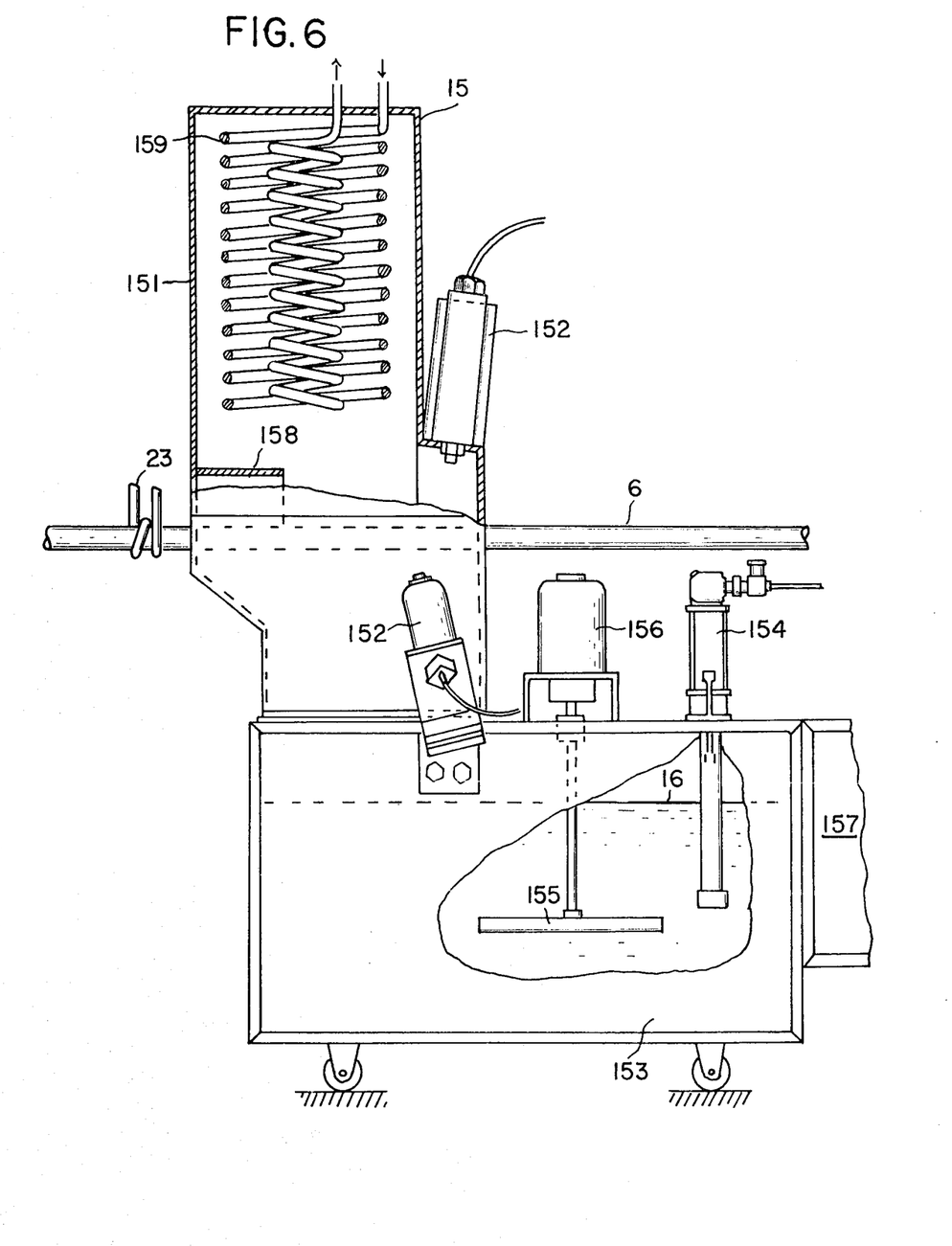
FIG. 6 and FIG. 7 show the device for spraying and recovering of adhesive.
Figure 7:
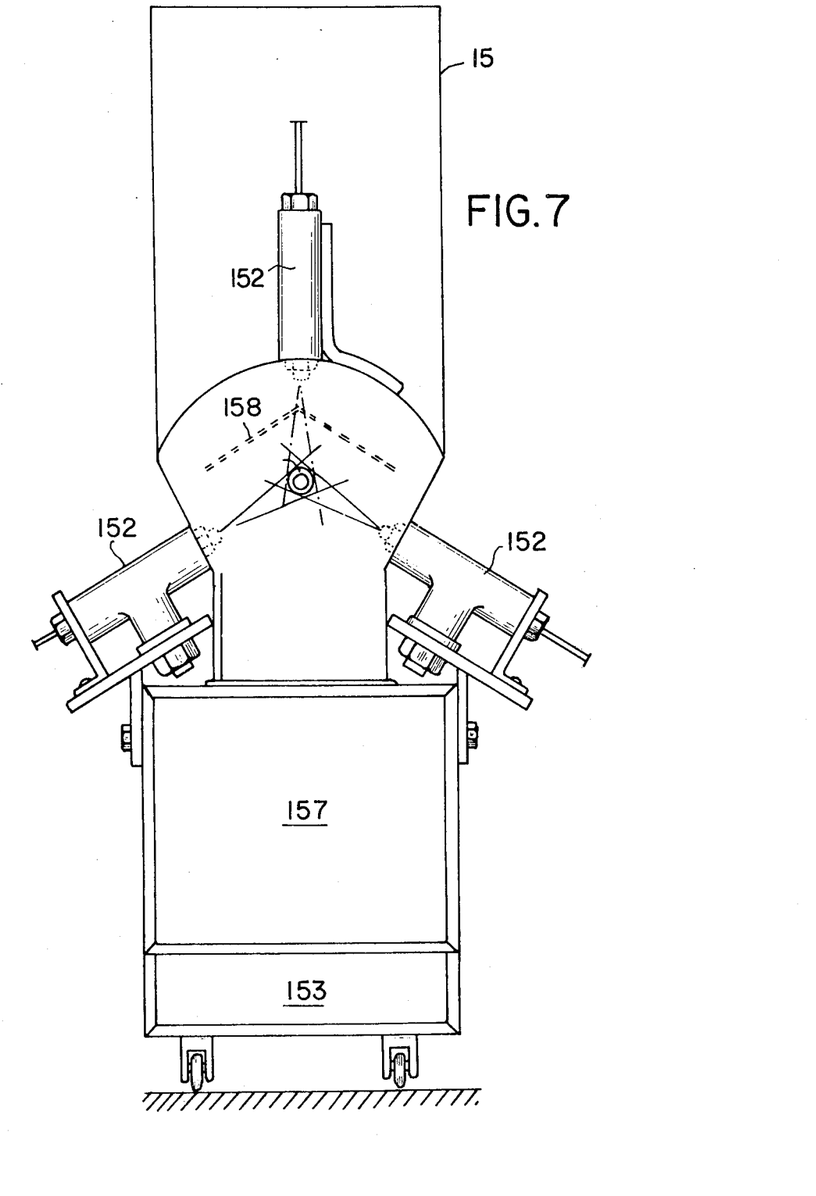

In FIG. 6 158 is a distributor plate that works for preventing the spraying in lumps of the liquid adhesive on the steel pipe 6. As the layout according to the drawing shows, the container tank 153 of the adhesive liquid serves as a stand, and it is movable by means of caster. The spray tank 151 is made of solid steel. A heat-exchanger (coil) 159 is installed on the spray tank 151, for cooling the mixture gas that stays in the spray chamber and turns, when cooled, into liquid. This arrangement serves also for preventing the pollution of air, possibly caused by the gas mixture of adhesive in spray tank, in the surrounding, inclusive the workshop and further saving of the adhesive. The adhesive liquid which is prepared in the closed spray chamber, being thermosetting, is stabilized, by drying itself as soon as it touches the steel pipe 6, which is preheated to about 200 C with the preheater coil 23. But the grains of the mixture of air and adhesive gas, that pass without reaching the steel pipe 6, float in the spray chamber and when they run against the wall of the chamber, they become liquid and flow down along the wall to drop into the tank 153.

The known process for the recovery of adhesive is carried out with the help of centrifuge, after sucking the mixture from the outlet pipe. However, this way of recovering the adhesive is exposed to the evaporation loss of the solution and the flow of the solution into the outer air cannot be checked, that is to say, the efficiency of recovering the adhesive stays low.

But, according to the process after the invention described above, that turns the gas mixture into liquid with the help of heat-exchanger 159 for cooling, the gas mixture of adhesive goes up and down in the spray chamber and gets cooled gradually and effectively, and turns itself into liquid condition, so that the adhesive and its solution could be easily recovered.

This arrangement provides a very effective recovery of adhesive, because the solution vapor becomes liquid in the closed chamber that checks the leak of solution vapor and further the exhaust equipment for gas mixture is no longer necessary, because the turning of vapor into liquid produces minus pressure of air within the chamber. Thus this process enables the recovery of almost 100% of the remaining adhesive.

As cooling medium for the heat-exchanger 159, water can be employed, and though cold water is preferable for this purpose, it is sufficient if the water, city water or industrial water, is as cold as about 15° – 20°C. Instead of water, Freon gas can be used with a good result.

It is thus seen that in the apparatus of the present invention the welding, i.e., the seaming of the welded pipe, occurs just prior to the spraying of paint on its inner surface. For this purpose the high frequency coils 8 produce Joule's heat at the joining line (seam point), which heat welds the seam. The rollers have forced the ends of the steel together so that inductive heat welds the closed ends. The ferromagnetic cores are used to concentrate the electromagnetic fields produced by the high frequency cores 8. Since the ferromagnetic core is heated a cooling fluid is provided to cool it by circulation of the fluid. The position of the gun-pipe and its nozzle enable the entire inner surface of the seamed pipe to be covered with paint after the seaming point. The welding, inner coating, application of exterior adhesive, and subsequent extrusion are thereby performed as a continuous processing.

I claim:
1. A device for coating the inner surface of a welded seamed steel pipe during its manufacture, comprising
   a gun-pipe (9) having an elongated pipe portion, a nozzle portion (11) at one end of said pipe portion and a tube at the opposite end of said pipe portion, said tube being adapted to be connected to a source of paint (12);
   an elongated ferromagnetic member having a hollow bore (101), said hollow bore surrounding a portion of said pipe portion with an inner space therebetween to permit the flow of cooling fluid between said pipe portion and said ferromagnetic member;
   a pipe holder (104) having an inflow port and an outflow port, an inlet pipe (21) connected to said inflow port to supply cooling fluid and connected to a source of cooling fluid, an outlet pipe (22) connected to said outflow port to remove the heated cooling fluid;
   a ported pipe (103,1031) having a port (1031), a slide sleeve (106) connected to said ported pipe, said slide sleeve (106) being slidably movable on said gun-pipe pipe portion which protrudes therethrough, a cap member (10), an enclosing electrically insulative casing pipe (105) closed by said cap member (10) at one end and closed by said pipe holder (104) at the opposite end, said casing pipe (105) surrounding said ferromagnetic member (101) with an outer space therebetween for the flow of cooling fluid, and a spring (108) positioned between said cap member and said slide sleeve to exert pressure on said slide sleeve (106) and through said ported pipe on said ferromagnetic member,
   a high frequency induction coil (8) for welding said seamed steel pipe, said coil being connected to a source of high frequency alternating current and positioned outside of and proximate to said electrically insulative casing pipe (105),
   wherein said inflow port is in fluid communication with the outer space between said casing pipe and said pipe portion and said outflow port is in fluid communication with the inner space between said ferromagnetic member and said gun-pipe pipe portion and wherein the gun-pipe protrudes through said cap so that its nozzle portion is within that portion of said steel pipe which has been seamed.

2. A device as in claim 1 wherein said ferromagnetic member (101) comprises a stack of ferromagnetic cores.

3. A device as in claim 1 wherein said outlet and inlet water pipes are made long enough to be thrusted into the steel pipe being manufactured through its still open joint and the ferromagnetic member and the nozzle portion is situated forward near the position where seaming occurs of said seaming point.

4. A device as in claim 1 and further including an electrically insulative bushing pipe (103) positioned between said pipe holder (104) and said ferromagnetic member (101).

5. A device as in claim 4 and further including two electrically insulative sleeves (102) one at either end of said ferromagnetic member (101) to position said ferromagnetic member, one of said sleeves having a recess to receive said ported pipe (1031, 103) and the other of said sleeves having a recess to receive said insulative bushing pipe (103).

6. A device as in claim 5 and further including waterproof packing positioned between said slide sleeve and said casing pipe and also between said slide sleeve and said gun-pipe pipe portion.

7. A device as in claim 4 wherein said ferromagnetic member comprises a stack of hollow ferromagnetic rings.

8. A device for welding and coating the inner surface of a welded seamed steel pipe during its manufacture, comprising
  a casing pipe (105) which is electrically insulative;
  a gun-pipe (9) having an elongated pipe portion, a nozzle portion (11) at one end of said pipe portion and a tube at the opposite end of said pipe portion, said tube being adapted to be connected to a source of paint (12);
  an elongated ferromagnetic member having a hollow bore (101), said hollow bore surrounding a portion of said pipe portion with an inner space therebetween to permit the flow of cooling fluid between said pipe portion and said ferromagnetic member, said casing pipe (105) surrounding said ferromagnetic member (101) with an outer space therebetween for the flow of cooling fluid;
  a high frequency induction coil (8) connected to a source of high frequency alternating current and positioned outside and proximate to said casing pipe;
  a pipe holder (104) having an inflow port and an outflow port, an inlet pipe (21) connected to said inflow port to supply cooling fluid and connected to a source of cooling fluid, an outlet pipe (22) connected to said outflow port to remove the heated cooling fluid and leading to a cooling fluid egress;
  wherein said inflow port is in fluid communication with the outer space between said casing pipe and said pipe portion, said induction coil is proximate the seaming location of said pipe and said nozzle portion is within the seamed pipe.

* * * * *

PO-1050
(5/69)

UNITED STATES PATENT OFFICE
CERTIFICATE OF CORRECTION

Patent No. 3,941,087　　　　　　　Dated March 2, 1976

Inventor(s) Yoshimi Yazaki

It is certified that error appears in the above-identified patent and that said Letters Patent are hereby corrected as shown below:

Column 1, line 66, "It" changed to -- In --;

Column 2, line 53, "6579" changed to -- 657.9 --;

Column 2, line 53, "255" changed to -- 25.5 --;

Column 2, line 54, "11095" changed to -- 110.95 --;

Column 2, line 54, "43" changed to -- 4.3 --;

Column 5, line 32, "once" changed to -- one --

Signed and Sealed this eleventh Day of May 1976

[SEAL]

Attest:

RUTH C. MASON
Attesting Officer

C. MARSHALL DANN
Commissioner of Patents and Trademarks